Sept. 8, 1970 A. J. DYER ET AL 3,527,967

MONOLITHIC CRYSTAL FILTERS WITH ULTRASONICALLY LOSSY MOUNTING MEANS

Filed June 3, 1969 4 Sheets-Sheet 1

INVENTORS
ARTHUR J. DYER
JOHN F. WERNER

BY Kirschstein, Kirschstein, Ottinger & Frank
ATTORNEYS

INVENTORS
ARTHUR J. DYER
JOHN F. WERNER

BY Kirschstein, Kirschstein, Ottinger & Frank
ATTORNEYS

INVENTORS
ARTHUR J. DYER
JOHN F. WERNER

BY Kirschstein, Kirschstein, Ottinger & Frank
ATTORNEYS

INVENTORS
ARTHUR J. DYER
JOHN F. WERNER
BY Kirschstein, Kirschstein, Ottinger & Frank
ATTORNEYS United States Patent Office 3,527,967

Patented Sept. 8, 1970

3,527,967

MONOLITHIC CRYSTAL FILTERS WITH ULTRASONICALLY LOSSY MOUNTING MEANS

Arthur Joseph Dyer, Watford, and John Francis Werner, Pinner, England, assignors to The General Electric and English Electric Companies Limited, London, England, a British company Filed June 3, 1969, Ser. No. 830,055
Claims priority, application Great Britain, June 4, 1968, 26,453/68
Int. Cl. H01v 7/00
U.S. Cl. 310—8.2 16 Claims

ABSTRACT OF THE DISCLOSURE

In a monolithic crystal filter assembly the crystal slab is secured to acoustically absorbent support means around its periphery. This helps to suppress unwanted resonances in the pass band of the filter. The support means may include a support member secured to the slab by means of a layer of acoustically absorbent adhesive.

This invention is concerned with improvements in or relating to electrical band-pass filters of the monolithic crystal type having at least two poles (i.e. sections).

Briefly, such an (n)-pole monolithic crystal filter is essentially made from a single slab of piezoelectric crystalline material. Each of the two opposite major faces of the slab is similarly partially coated with a sequence of (n) spaced electrodes so as to form a sequence of (n) similar "sandwiches" which are separated by uncoated portions of the slab. Each such sandwich acts as a mechanical resonator and forms one section of the filter, each such resonator being mechanically coupled (via an uncoated portion of the slab) to the next following resonator in the sequence. In use, the first resonator in the sequence is electrically excited at a suitable frequency or frequencies, and the piezoelectric effect causes mechanical oscillation of that resonator, that oscillation being communicated in turn to each resonator in the sequence; finally, an electrical output is obtained from the last resonator in the sequence, by virtue of the piezoelectric effect. Such an arrangement acts as an electrical band-pass filter of which the input terminals and the output terminals are respectively constituted by the electrodes of the first and of the last resonator in the sequence. The centre frequencies of such filters are typically of the order of 1–150 mHz.

At least some of the electrodes of the crystal slab of such a filter are normally connected to corresponding external electrical terminals, by way of connections made of electrically conducting material, and the crystal slab is customarily wholly supported by those electrical terminals, by way of those connections, the crystal slab thus being supported at a small number of separated positions. With such support arrangements, it is known that unwanted transverse shear vibrations of the crystal slab tend to occur, causing unwanted resonances in the stop band of the filter.

It is an object of the invention to provide an improved method of supporting the crystal slab of a monolithic crystal filter.

According to the invention, there is provided a monolithic crystal filter assembly comprising: a single crystal slab of piezoelectric material having two major faces, each major face being similarly partially coated with a sequence of spaced electrodes, whereby the slab can vibrate in a first set of modes in which the vibrations are substantially trapped under said electrodes, and in a second set of modes in which the vibrations are untrapped, the coated portions of the slab forming a sequence of mechanical resonators separated by uncoated portions of the slab and coupled mechanically only, via said uncoated portions; and support means for the crystal slab, to which support means the crystal slab is secured over a peripherally extending band of at least one of said two major faces, at least the part of the support means in contact with the slabs being made of a material which is ultrasonically lossy at the operating frequencies of the filter, and said band extending continuously around the periphery of the corresponding said major face and being spaced from those filter electrodes which are provided on that face by distances which are sufficiently large so as substantially not to interfere with said trapped vibrations, and sufficiently small so that said free vibrations are substantially damped by the support means.

The part of the support means in contact with the slab may comprise a layer of adhesive material, which serves to secure the crystal slab to at least one support member.

The or each support member is preferably sufficiently rigid to facilitate handling and/or mounting of the assembly by means of the support member or members.

Conveniently, a said support member may be a printed circuit board.

The invention may be put into practice in a number of ways, but one specific embodiment and a number of modifications thereof will now be described by way of example, with reference to the drawings accompanying the provisional specification of which:

Figure 1:
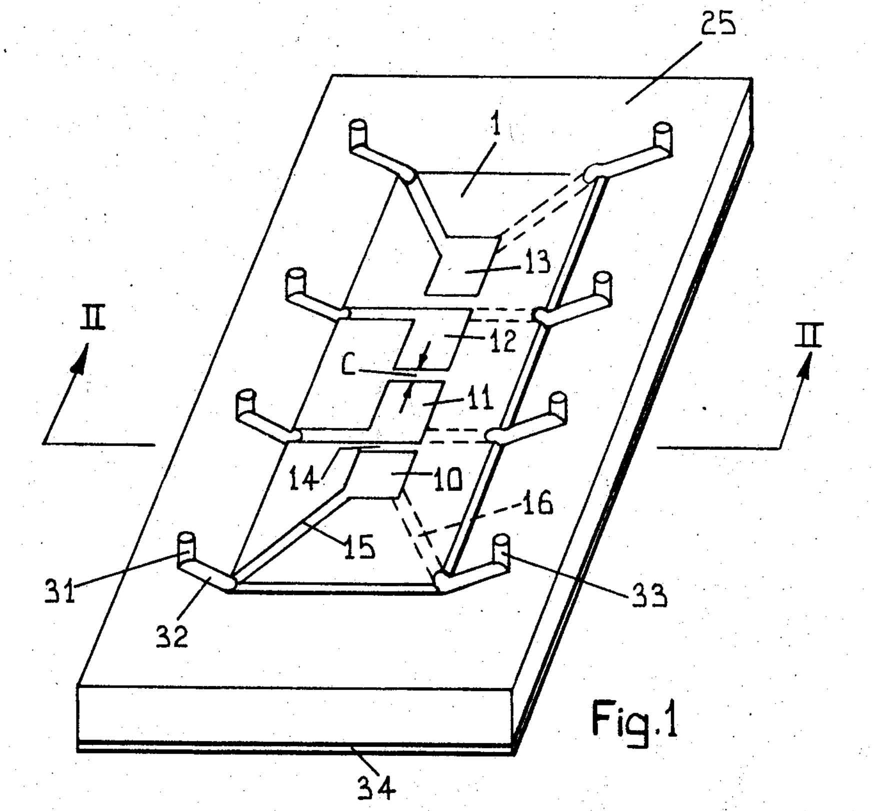
FIG. 1 is an enlarged view of a 4-pole monolithic crystal filter having its crystal slab mounted according to the invention.
Figure 2:
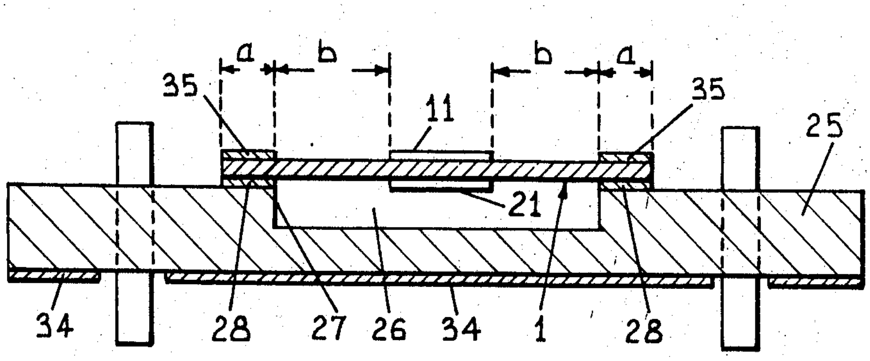
FIG. 2 is a lateral cross-section, twice enlarged relatively to FIG. 1, taken along the line II—II of FIG. 1.

Referring to FIGS. 1 and 2, the 4-pole monolithic crystal filter is essentially made from a single slab 1 of a single crystal of piezoelectric crystalline material which may be quartz (which may be AT-cut or BT-cut) or any other suitable material. Each of the two opposite major faces of the slab is similarly partially coated with a linear sequence of four spaced electrodes (such as 10–13, FIG. 1, and 21 in FIG. 2), so as to form a linear sequence of four substantially identical "sandwiches" which are equally separated by uncoated portions (such as 14, FIG. 1) of the crystal slab 1. Each such sandwich acts as a mechanical resonator and forms one section of the filter, each such resonator being mechanically coupled (via an uncoated portion of the slab, such as 14) to the next following resonator in the sequence.

Each electrode merges into a separate corresponding electrically conductive coating, in the form of a connection strip (such as 15 and 16, FIG. 1) which extends across the relevant major face of the crystal slab 1, to the edge of that face.

Considering, first, only one of the resonators (such as 11, 21 in FIG. 2), the operation of the filter depends upon transverse shear vibrations of that part of the slab 1 which is located between the electrodes 11 and 21.

If the resonator (11, 21) is excited electrically, at suitable frequencies (typically of the order of 1–150 mHz.), by connection of an alternating-current source to the electrodes 11 and 21, such transverse shear vibrations can be set up in the resonator, by virtue of the piezoelectric effect, and the resonator can be made to resonate mechanically in a large number of different modes. Correspondingly, so far as the alternating-current source is concerned, the resonator (11, 21) exhibits electrical resonances at a large number of frequencies: briefly, there is, firstly, a fundamental frequency of resonance of the resonator, and a series of odd-order harmonic overtones thereof. Further, for each of that fundamental frequency and its harmonic overtones, there is a corresponding series of anharmonic overtones thereof.

For a typical resonator (such as 11, 21), the said fundamental frequency of its resonance is lower than the corresponding natural frequency of resonance of the surrounding uncoated portions (such as 14) of the slab 1, due to the presence of the electrodes 11 and 21. Consequently, those uncoated portions act, at that frequency, in a manner similar to a waveguide excited at a frequency below its cut-off frequency, with the result that the vibrations of the resonator, at the said fundamental frequency, are effectively trapped under the electrodes 11 and 21, such vibrations (at that frequency) as are transmitted to the said uncoated portions of the slab 10 being propagated as an evanescent mode.

By suitably choosing the material, the area and the thickness of each of the electrodes 11 and 21, it is possible to arrange that such trapping occurs for the said fundamental frequency of that resonator, but does not occur for the said anharmonic overtones of that fundamental frequency.

In the simplest form of monolithic crystal filter (referred to herein, for convenience, as "a fundamental-frequency filter"), each of the resonators (such as the four of FIGS. 1 and 2) is arranged as in the preceding paragraph, so that each resonator is mechanically coupled to the next following resonator, so far as the said fundamental frequency of that resonator is concerned, by way of the said evanescent mode of propagation through an uncoated portion of the slab 1. The coefficients of coupling are precisely controlled by suitable choice (in generally known manner) of the material or materials, the thicknesses, the areas and the separations of the electrodes of the resonators.

Such a filter is basically intended to have a centre frequency approximately equal to the said fundamental frequency of resonance of each of the resonators.

It is also possible, however, to construct a monolithic crystal filter (referred to herein, for convenience, as "a harmonic filter") having a centre frequency approximately equal to the frequency of any one of the said odd-order harmonic overtones of the said fundamental frequency of resonance of the resonators of that filter, the 3rd-order and the 5th-order harmonic overtones being particularly of interest. In this case, the resonators are again of the general form described above with reference to FIGS. 1 and 2, but, for each such resonator, the material or materials and the areas and the thicknesses of its electrodes are so chosen (in generally known manner) that the trapping referred to above occurs for the chosen said odd-order harmonic overtone but does not occur for the said anharmonic overtones of that harmonic overtone.

The invention is applicable both to such a fundamental-frequency filter and to such a harmonic filter.

When such a fundamental-frequency filter or such a harmonic filter is in use, the input terminals and the output terminals of the filter are respectively constituted by the electrodes of the first and of the last resonator in the sequence of resonators, and an alternating-current source (of frequency typically of the order of 1–150 mHz.) may be considered to be connected to those input terminals. That alternating-current source tends to set up transverse shear vibrations in the composite structure comprising the crystal slab 1 and its pairs of electrodes, and that composite structure can be made to resonate mechanically in a large number of different modes, some of which are useful in the operation of the filter and some of which are unwanted modes which tend to impair the performance of the filter. Briefly, if each individual resonator of the sequence of resonators is arranged for the trapping described above, then, when the filter is operating as desired, the electrodes of the composite structure comprising the crystal slab 1 and its pairs of electrodes may be regarded as acting to trap (in a manner similar to that described above, with reference to a single resonator) a series of modes of mechanical vibration of that composite structure, which series comprises a principal mode of vibration and a series of anharmonic overtones of that principal mode; the desired electrical transmission characteristic of the filter is obtained by causing the composite structure to resonate in that series of trapped modes, at frequencies within the electrical band-pass of the filter.

The said unwanted modes of vibration of the composite structure include modes which are not trapped by the pairs of electrodes and which therefore involve unwanted vibration of the whole of the crystal slab 1.

So far as the alternating current source supplying the filter is concerned, then, the filter tends to exhibit electrical resonances at a large number of frequencies. Of these resonances, those corresponding to the said series of trapped modes of mechanical vibration of the composite structure are useful and necessary in the operation of the filter, but the remaining unwanted resonances tend to impair the performance of the filter.

Figure 3:
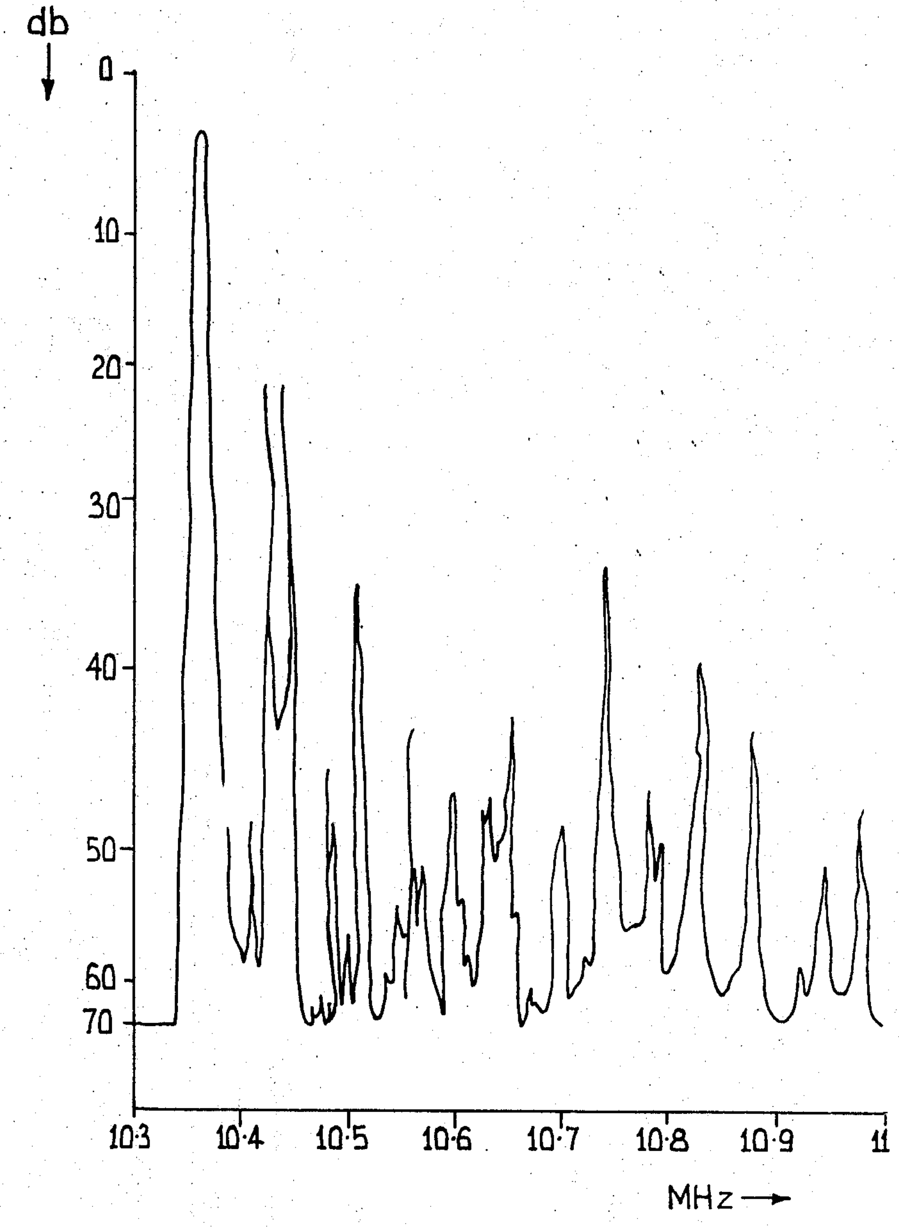
FIG. 3 is a graph, showing the electrical transmission characteristic of a 4-pole monolithic crystal filter of which the crystal slab is wholly supported, in known manner, by the external electrical terminals of the filter.

It is customary to wholly support the crystal slab 10, at a small number of separated positions, by the external electrical terminals of the filter, which terminals are connected as necessary to the electrodes of the filter by way of connections made of electrically conducting material. When the crystal slab 10 is supported in this manner, the mechanical energy of the said unwanted modes of mechanical vibration of the said composite structure is not satisfactorily dissipated via the supporting terminals, with the result that, regarded electrically, the filter exhibits a large number of electrical resonances which are unwanted. Thus, FIG. 3 shows the electrical transmission characteristic of a 4-pole monolithic crystal filter of which the crystal slab is wholly supported, in known manner, by the external electrical terminals of the filter, the attenuation (in decibels) being plotted as ordinate, and the abscissa representing the frequency in mHz.).

In accordance with the invention, a filter with an improved electrical transmission characteristic is obtained by supporting the crystal slab 1 as indicated in FIGS. 1 and 2. The crystal slab 1 is ultimately supported by a single support member 25, in the form of a suitably thick block or sheet of suitable material (see below), the major faces of the support member 25 being of larger dimensions than the corresponding dimensions of the crystal slab 1. The support member 25 is provided, at one of its major faces, with a central cavity 26 having such dimensions that the crystal slab can be placed over the entrance to the cavity in such a way that the crystal slab everywhere overlaps the edges (e.g. 27) of the cavity by a distance indicated as *a* in FIG. 2. Everywhere along this overlap, the crystal slab 1 is joined to the support member 25 by means of an interposed layer 28 of adhesive or of cement or of other hardened hardenable material, which is ultrasonically lossy, at the operating frequencies of the filter, such that the mechanical energy of the said unwanted modes of mechanical vibration of the composite structure of the crystal slab 1 and its electrodes will tend to be dissipated in the layer 28. It will thus be appreciated that the layer 28 may be considered to be a support means, by way of which the crystal slab is supported, the crystal slab being ultimately supported by the support member 25. Further, the crystal slab is secured to the layer 28, by the action of the adhesive or cement, over a peripherally extending band of one major face of the crystal slab, that band extending continuously around the periphery of that major face.

The material of the support member 25 is, firstly, chosen to be rigid enough to permit the filter assembly to be handled relatively easily (it being relatively difficult to handle the unmounted crystal slab 1 without risk of damage), and/or to permit the filter assembly to be mounted in a desired position by way of the support member 25.

Secondly, the support member 25 is preferably (but not essentially) made of a material which is, at the operating frequencies of the filter, ultrasonically lossy, such that the said dissipative action of the layer 28 will be assisted by the similar action of the support member 25.

The layer 28 and the support member 25 are preferably (but not necessarily) made of electrically insulating material, since otherwise care will have to be taken to ensure that neither is anywhere in electrical contact with the connection strips (such as 16) to the electrodes.

In the case where the crystal slab 1 is of quartz, the support member 25 may be made of a thermo-setting resin (such as "Paxolin," registered trademark) or of bonded glass-fibre board, and the layer 28 may be of a polystyrenexylol cement (such as "Distrene," registered trademark) or of an epoxy resin (such as "Araldite," registered trademark).

In the construction of the filter of FIGS. 1 and 2, the crystal slab 1 is first provided, in known manner, with the electrodes and with the connection strips (e.g. 15 and 16) to the electrodes. In the case of those connection strips (e.g. 16) which lie upon that major face of the crystal slab 1 which is to be secured to the support member 25, each of those strips is first extended up the edge of the crystal slab 1 and over to the other major face of the slab 1, by means of electrically conductive paint or cement. The layer 28 of adhesive or cement is then applied to the supporting member 25, whereafter the crystal slab 1 is mounted in position. Each of the connecting strips 15 of the exposed major face of the slab 1 is thereafter electrically connected to a separate corresponding external terminal such as a pin (e.g. 31, FIG. 1), by way of a strip 32 of electrically conductive paint or cement; similarly, each of the connections previously made to the connecting strips 16 of the other major face of the slab 1 is similarly connected to a separate corresponding terminal pin (e.g. 33, FIG. 1). Each of the terminal pins (e.g. 31 and 33) is secured in a corresponding bore in the support member 25, and projects from each major face of that support member.

Finally, that major face of the support member which does not contain the cavity 26 is covered or coated (except in the regions where the terminal pins project) with a layer 34 of electrically conductive material which, in use of the filter, is connected to earth to reduce the inter-electrode capacitances; the layer 34 may be made of painted-on silver paste, or of copper sheet.

The operation of such a filter may sometimes be still further improved, by coating the exposed major face of the crystal slab 1, over a peripherally extending band which extends continuously or almost continuously around the periphery of that face, with a layer 35 (FIG. 2) of material which is ultrasonically lossy, at the operating frequencies of the filter. The material of the layer 35 may be "Distrene" cement or silver paste.

In the construction of the filter of FIGS. 1 and 2, it is essential that the said band, over which the crystal slab 1 is connected to the support member 25, be everywhere spaced from the electrodes upon the relevant major face of the slab 1 by distances, e.g. *b* in FIG. 2, which are sufficiently large to permit the desired operation of the filter, as described above. So far as the composite structure comprising the slab 1 and its electrodes is concerned, the distances *b* must be made large enough to effectively avoid any interference with the mechanical vibrations of that composite structure in the useful trapped modes referred to above (remembering that the rate of decay of the amplitude of such vibrations is exponential with distances away from the electrodes); on the other hand, the distances *b* should not be so large that the said unwanted modes of vibration of the composite structure are not damped as much as is practicable. From an alternative point of view, so far as each individual resonator (e.g. 11, 21) is concerned, the separation, *c* in FIG. 1, of the electrodes of that resonator from the electrodes of the next following resonator in the sequence will have been chosen (in known manner) to be small enough to permit a suitable degree of mechanical coupling between those two resonators, at the frequency of the trapped mode in question (see above) of that resonator; in choosing the distances *b*, it is desired to avoid or substantially avoid any such mechanical coupling, at that frequency, between each resonator (e.g. 11, 21) and the support member 25, and the distances *b* should be correspondingly large enough. Thus, the preceding sentence indicates that the distances *b* should be a sufficient amount greater than the separation *c* of the electrodes, bearing in mind that the rate of decay of the amplitude of the vibrations, in the trapped mode mentioned in the preceding sentence, is exponential with distance away from the electrodes of the resonator in question.

Thus, so far as is at present understood, the most effective magnitudes of the distances *b* must be determined by experiment, in the case of each particular design of filter concerned, bearing in mind the arguments of the preceding paragraph.

Figure 4:
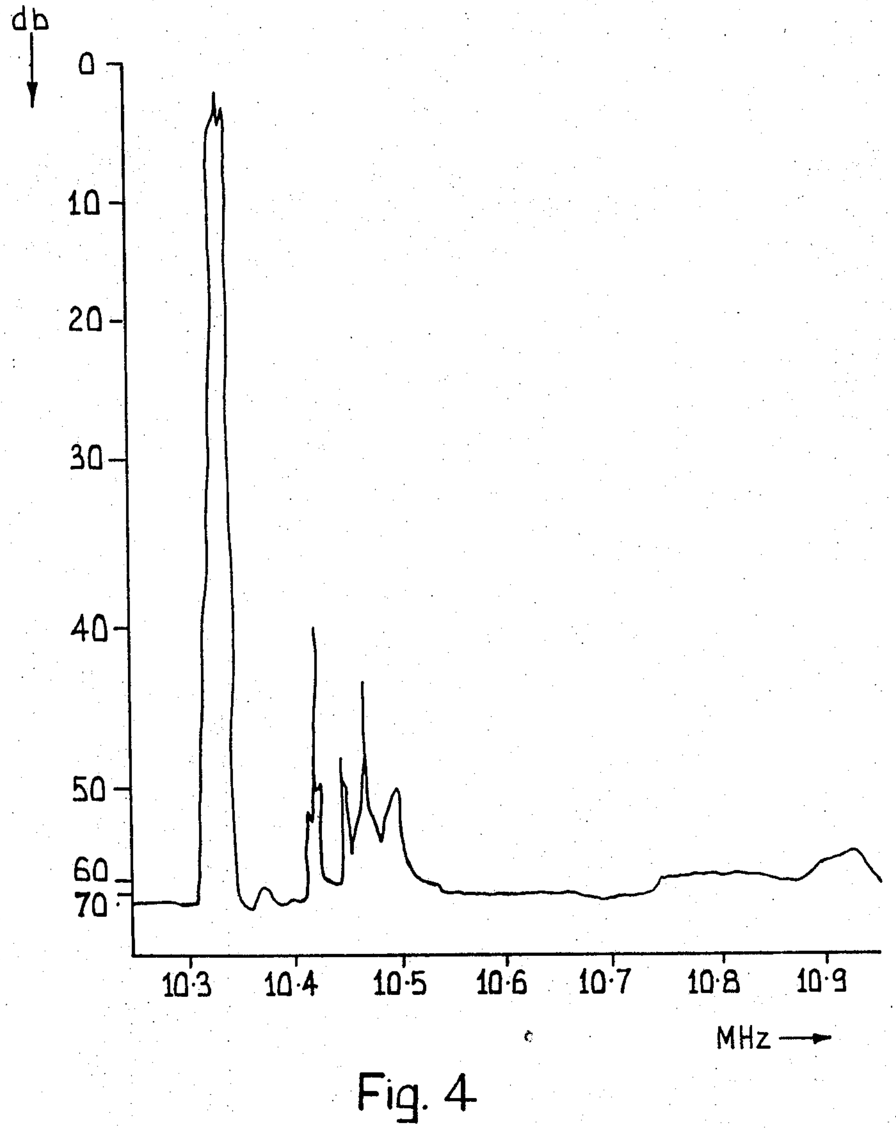
FIG. 4 is similar to FIG. 3, but relates to the 4-pole monolithic crystal filter of which the crystal slab is supported in the manner of FIGS. 1 and 2.

In the case of one particular filter constructed according to FIGS. 1 and 2, the crystal slab 1 had a length of 24 mm. and a width of 12 mm. Each of the electrodes was about 3 mm. x 3 mm. in size, and the separation *c* of the electrodes was about ½ mm. The width *a* of the band over which the crystal slab 1 was secured to the support member was about 1½ mm., and the distances *b* between that band and the electrodes were about 3 mm. The electrical transmission characteristics of such a filter, mounted as in FIGS. 1 and 2, is given in FIG. 4 (which is otherwise similar to FIG. 3); it will be seen that many of the unwanted electrical resonances of FIG. 3 have been suppressed.

Figure 5:
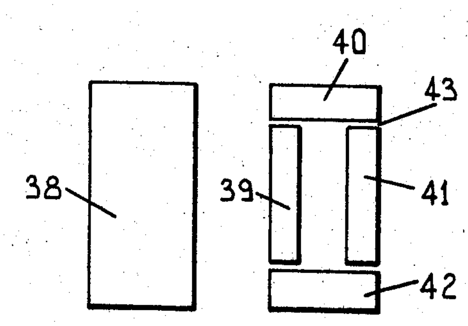
FIG. 5 illustrates, to a reduced scale, one possible method of construction of the support member of FIGS. 1 and 2.

The support member 25 of FIGS. 1 and 2 need not be formed from a single body of material and, moveover, the band over which the crystal slab 1 is secured to the support means constituted by the layer 28, need not be absolutely continuous. Thus, it is convenient to construct the support member 25 from (FIG. 5) a baseplate 38 and four strips 39–42, all made of "Paxolin" sheet, the strips 39–42 being secured (by an adhesive or a cement, for example "Distrene" cement) to the baseplate 38 to form a body similar to the support member 25 of FIGS. 1 and 2. In particular, it is not necessary to ensure that, after such assembly, no gaps (such as 43) occur between the strips 39–42.

In a modification (FIG. 6) of the arrangement of FIGS. 1 and 2, the single support member 25 may be provided, instead of the cavity 26, with a similar straight-through aperture 45, the crystal slab 1 being otherwise secured to the support member 25 as described with reference to FIGS. 1 and 2. In particular, the support member 25 may be a printed-circuit board having the aperture 45 formed in it, electrical connections between the connection strips (as 15 and 16, FIG. 1) and the electrical circuit printed upon the board, being made by means of electrically conductive paint or cement.

Figure 6:
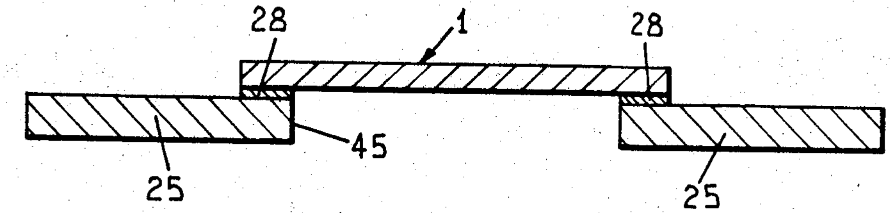
FIG. 6 is similar to FIG. 2 but illustrates a modification of the invention.
Figure 7:
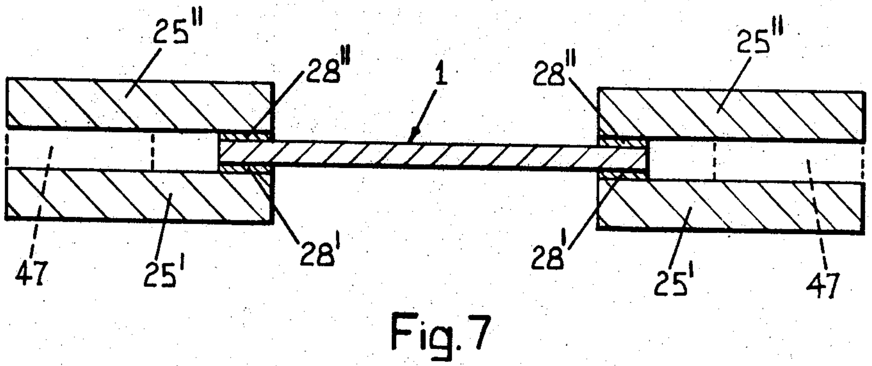
FIG. 7 is similar to FIGS. 2 and 6, but illustrates a further modification of the invention.

In a further modification (FIG. 7) of the arrangements of FIGS. 1 and 2, or 6, each of the two major faces of the crystal slab 1 is similarly secured to a separate corresponding one of two support members 25′ and 25″, respectively by way of layers 28′ and 28″ of adhesive or of cement. The arrangements are similar to those described above, and similar remarks apply. The two support members 25′ and 25″ may be separated, or may be joined together by material indicated at 47.

Figure 8:
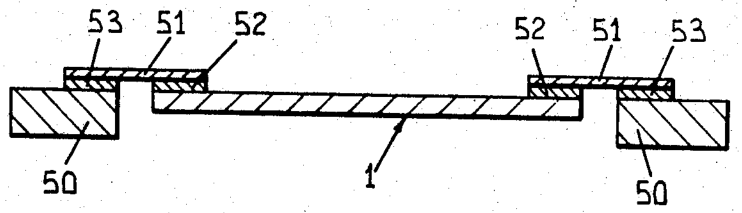
FIG. 8 is similar to FIGS. 2, 6 and 7, but illustrates yet another modification of the invention.

In a modification (FIG. 8) of the invention, the crystal slab 1 is ultimately supported by a support member 50 which is made of a material which is rigid enough to permit the said handling and/or mounting of the filter assembly, but which is not necessarily ultrasonically lossy, at the operating frequencies of the filter. The crystal slab 1 and the member 50 are joined together by way of an intermediate support member or members which may, for example, be in the form of a strip or strips 51, and which are made of material which is rigid enough to satisfactorily join the crystal slab 1 to the member 50 but which (by itself) is not rigid enough to permit the said handling and/or mounting of the filter assembly. The material of the intermediate support member or members is not necessarily ultrasonically lossy, at the operating frequencies of the filter, although this is likely to be advantageous. The strip or strips 51 may be made of neoprene or of polythene. The intermediate support member or members is or are joined to the crystal slab 1 by an interposed layer 52 of adhesive or of cement similar to the layer 28, in a manner similar to that described with reference to FIGS. 1 and 2. Finally, the intermediate support member or members is or are joined to the support member 50 by a further interposed layer 53 of adhesive or of cement which is not necessarily ultrasonically lossy, at the operating frequencies of the filter.

We claim:

1. A monolithic crystal filter assembly comprising: a single crystal slab of piezoelectric material having two major faces, each major face being similarly partially coated with a sequence of spaced electrodes, whereby the slab can vibrate in a first set of modes in which the vibrations are substantially trapped under said electrodes, and in a second set of modes in which the vibrations are untrapped, the coated portions of the slab forming a sequence of mechanical resonators separated by uncoated portions of the slab and coupled mechanically only, via said uncoated portions; and support means for the crystal slab, to which support means the crystal slab is secured over a peripherally extending band of at least one of said two major faces, at least the part of the support means in contact with the slab being made of a material which is ultrasonically lossy at the operating frequencies of the filter, and said band extending continuously around the periphery of the corresponding said major face and being spaced from those filter electrodes which are provided on that face by distances which are sufficiently large so as substantially not to interfere with said trapped vibrations, and sufficiently small so that said free vibrations are substantially damped by the support means.

2. A monolithic crystal filter assembly as claimed in claim 1 wherein said support means includes at least one support member the part of the support means in contact with the slab comprising a layer of adhesive material which serves to secure the slab to said support member.

3. A monolithic crystal filter assembly as claimed in claim 2 wherein said layer consists of a hardened hardenable material.

4. A monolithic crystal filter assembly as claimed in claim 2 wherein said layer consists of an electrically insulating material.

5. A monolithic crystal filter assembly as claimed in claim 2 wherein the support member is sufficiently rigid to facilitate handling and mounting of the assembly by means of the support member.

6. A monolithic crystal filter assembly as claimed in claim 2 wherein said support member has a cavity formed in a face thereof, over which cavity the slab is secured.

7. A monolithic crystal filter assembly as claimed in claim 6 wherein the slab overlaps the face of said support member around the edge of said cavity and is secured to said face where it overlaps the support member.

8. A monolithic crystal filter assembly as claimed in claim 6 wherein the face of said support member opposite to the face from which the cavity extends carries an electrically conductive layer.

9. A monolithic crystal filter assembly as claimed in claim 2 wherein said support member has an aperture extending through it, over which aperture the slab is secured.

10. A monolithic crystal filter assembly as claimed in claim 9 wherein the slab overlaps the face of said support member around the edge of said aperture and is secured to said face where it overlaps the support member.

11. A monolithic crystal filter assembly as claimed in claim 2 wherein the support member is made of a material which is ultrasonically lossy at the operating frequencies of the filter.

12. A monolithic crystal filter assembly as claimed in claim 2 wherein the support member is made of an electrically insulating material.

13. A monolithic crystal filter assembly as claimed in claim 2 wherein one major face of the crystal is secured to said support means and the other major face carries, over a band extending continuously or substantially continuously around the periphery of that other major face, a layer of adhesive material which is ultrasonically more lossy at the operating frequencies of the filter, than the material of the slab.

14. A monolithic crystal filter assembly as claimed in claim 1 wherein the support means comprises a first support member and at least one further support member, intermediate the slab and said first support member, by way of which further support member the crystal slab is secured to said first support member, and which further support member is not by itself sufficiently rigid to facilitate handling and mounting of the assembly.

15. A monolithic crystal filter assembly as claimed in claim 14 wherein said intermediate support member is made of a material which is ultrasonically lossy at the operating frequencies of the filter.

16. A monolithic crystal filter assembly as claimed in claim 2 wherein said support member is a printed circuit board.

References Cited

UNITED STATES PATENTS

| | | | |
|---|---|---|---|
| 3,018,451 | 1/1962 | Mattiat | 310—9.8 |
| 3,047,749 | 7/1962 | Fisher | 310—9.4 |
| 3,073,975 | 1/1963 | Bigler | 310—9.4 |
| 3,359,435 | 12/1967 | Webb | 310—9.1 |
| 3,396,287 | 8/1968 | Horton | 310—9.1 |
| 3,405,224 | 10/1968 | Yawata | 317—234 |
| 3,436,669 | 4/1969 | Russell | 317—234 |
| 3,437,849 | 4/1969 | Treatch | 317—234 |
| 3,453,458 | 7/1969 | Curran | 310—9.1 |
| 3,460,005 | 5/1969 | Kanda | 317—235 |

MILTON O. HIRSHFIELD, Primary Examiner

M. O. BUDD, Assistant Examiner

U.S. Cl. X.R.

310—9.4, 9.8; 333—72